United States Patent Office 2,807,180
Patented Sept. 24, 1957

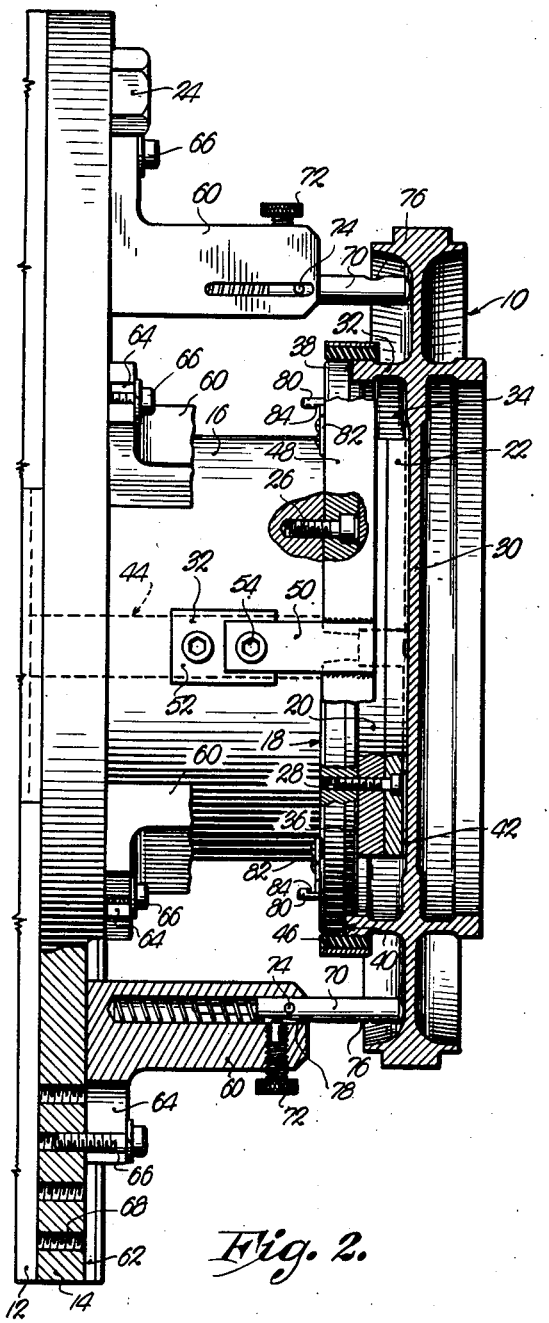

2,807,180

VACUUM HOLDING FIXTURE FOR POWER MACHINE TOOLS

Jesse Wallace Adams, Independence, Mo.

Application November 30, 1953, Serial No. 395,149

3 Claims. (Cl. 82—40)

This invention relates to fixtures or holding devices for mounting workpieces upon machine tools, utilizing vacuum as the holding means and including as an important object the provision of means to seal the joint between the workpiece and part of the fixture against the passage of air from the atmosphere under influence of the vacuum applied to the workpiece.

It is the primary object of the present invention to provide a vacuum holding fixture for mounting workpieces upon rotatable structure of machine tools having as a component part thereof, not only means to prevent distortion of the workpiece as a cutter is applied thereto, but means to positively avoid loss of holding force incident to application of vacuum to the workpiece by the provision of a seal having means permitting clamping of the seal tightly in place in overlapping relationship to a portion of the workpiece and a part of the fixture where such parts meet in a lap joint.

Another important object of the present invention is to provide a holding fixture of the aforementioned character having a locating disc upon which is mounted a contact plate provided with a plurality of ribs engageable with a portion of the workpiece, all cooperable with a plurality of spring-loaded jack pins, also engageable with the said workpiece to prevent distortion of the latter.

A still further object of the present invention is to include in a holding fixture of the vacuum type, pin means engageable with an edge of the workpiece for aiding in measurement of the dimensions of one face of the workpiece as a cutter is applied thereto.

In the drawings:

Fig. 2 is a cross-sectional view taken on irregular line II—II of Fig. 1.

Fig. 3 is an enlarged, fragmentary, detailed, cross-sectional view taken on line III—III of Fig. 1; and Fig. 4 is a perspective view of the sealing means, together with the clamping ring therefor, all shown entirely removed from the support block to which the same is normally attached.

Figure 1:
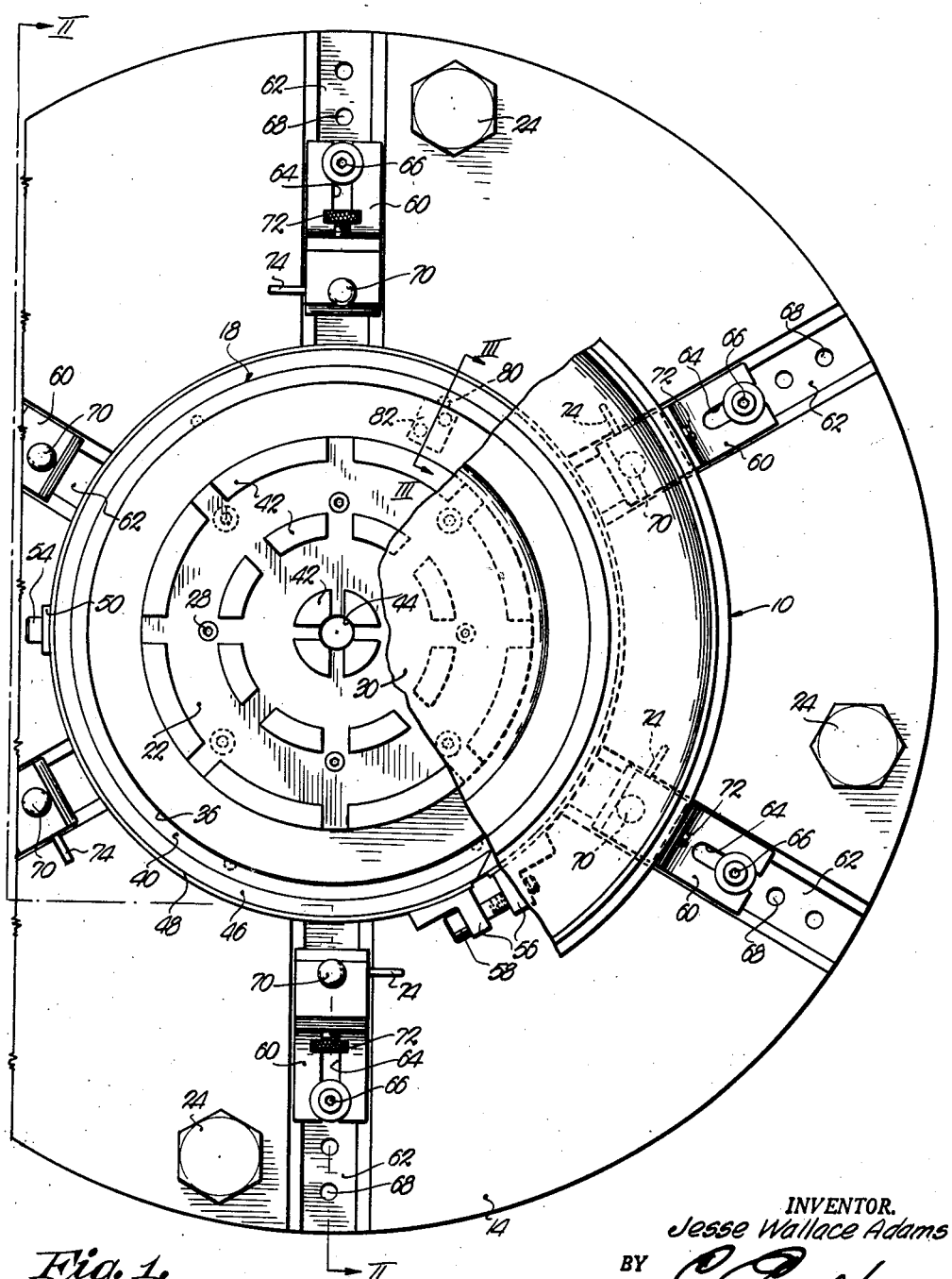
Figure 1 is a fragmentary, elevational view of a vacuum holding fixture for power machine tools made according to my present invention, a portion of the workpiece being broken away to reveal details of construction of the workpiece.

In attempting to solve the problems incident to providing a satisfactory fixture or holding device for machining workpieces having no practical way of attachment through use of conventional chucks, face plates or the like, it became necessary to no only avoid distortion of the workpiece during machining thereof, but to positively eliminate passage of air to avoid the necessity of an extremely high vacuum.

While the fixture about to be described has been designed to mount and hold jet engine compressor wheels, broadly designated by the numeral 10 in the drawings, it is to be understood that the same principles may be followed for other types of workpieces, particularly where the problem of distortion is always present as in the case of aluminum and thin section steel wheels or the like.

According to the present invention, the workpiece 10 to be machined, is held in place by means of vacuum supplied to the fixture and there is included a novel sealing arrangement permitting operation at a relatively low vacuum held within specific high and low limits.

The equipment about to be described has been adapted particularly for use on a tracer-type engine lathe not herein illustrated, but a portion of the rotatable structure of such lathe is shown fragmentarily in Fig. 2 and designated by the numeral 12.

The fixture includes as its basic component parts, a base member 14, a supporting block 16, a locating disc 18, a filler element 20, and a contact plate 22. The base plate 14 may be mounted upon structure 12 of the lathe in any suitable manner such as by provision of a plurality of bolts or other fixtures 24. Block 16 is secured rigidly to one face of the base member 14 by means which may include welding and the locating disc 18 is secured to the supporting block 16 by a number of fasteners 26. The filler plate 20 is interposed between disc 18 and the plate 22 and held clamped in place by a number of fasteners 28.

The workpiece 10 has an imperforate wall 30 and an annular flange 32 integral with one face of the wall 30 presenting a cavity 34 that receives the filler element 20, the contact plate 22 and a portion of the locating disc 18. Disc 18 is cut away to present an annular shoulder 36 having substantially the same diameter as the inside diameter of the flange 32 and when the workpiece 10 is mounted in place, the flange 32 surrounds the shoulder 36 and the annular edge 38 of the flange 32 is in facing relationship to a circular, marginal edge 40 on one face of the disc 18 that is perpendicular to the shoulder 36.

The thickness of the filler element 20 depends upon the depth of the cavity 34 and, therefore, a number of plate-like elements 20 may be provided so that the fixture is adapted to accommodate various types of workpieces.

The contact plate 22 is provided with a plurality of ribs 42 against which the wall 30 of workpiece 10 flatly engages when the workpiece 10 is mounted on the fixture.

A continuous bore or passage, broadly designated by the numeral 44, is formed in the base member 14, the supporting block 16, the locating disc 18, the filler element 20 and the contact plate 22 in register with the cavity 34 and utilized to apply vacuum to the cavity 34 and thereby hold the wall 30 in tight engagement with the ribs 42. The source of vacuum is not illustrated, but may be operably coupled with the passage 44 through any conventional, rotating pressure joint not illustrated.

In order to assure a firm interengagement between the wall 30 and the ribs 42, the thickness of filler element 20 should be chosen so that there is no direct interengagement between the annular edge 38 of the flange 32 and the circular, marginal edge 40 of the locating disc 18. Similarly, while the shoulder 36 is utilized to locate the workpiece 10, it is impractical to provide a fluid-tight joint between the shoulder 36 and the innermost, annular periphery of the flange 32. In order to avoid the necessity of extremely high vacuums, passage of air into the cavity 34 must be avoided and, therefore, there is included a split, annular seal of resilient material such as rubber, designated by the numeral 46, that completely surrounds the annular periphery of the locating disc 18, as well as the annular periphery of the flange 32 as is best illustrated in Figs. 2 and 3 of the drawings.

In order to hold the sealing band 46 tightly in place, it is in turn surrounded by a split ring 48 that is secured to the block 16 by a bracket 50. A small block 52 is interposed between the bracket 50 and the block 16, and is secured to the latter. A fastener 54 connects the bracket 50 with the block 52.

A pair of opposed ears 56 on the split ring 48 receive a take-up bolt 58 serving to clamp the sealing band 46 tightly against the locating disc 18 and the flange 32 to close the joint between edges 38 and 40.

Jack means is provided on the base member 14 to back the workpiece 10 and thereby cooperate with the ribs 42 in preventing distortion of the workpiece 10 when a cutter (not shown) forming a part of the lathe or other power machine tool, is applied to that surface of the workpiece 10 opposite to the flange 32. The jack means includes a plurality of L-shaped jack blocks 60 slidable in radial ways 62 formed in the base member 14. Each jack block 60 has a slot 64 for receiving a fastening bolt 66 that may be threaded in any one of a number of tapped openings 68 in the base member 14.

Each jack block 60 has a spring-loaded jack pin 70 that bears against the wall 30 exteriorly of the cavity 34 and which is held in place by a setscrew 72. The pin 70 may be retracted through use of a transverse pin 74 upon loosening of the setscrew 72, an indentation 76 in the pin 70 cooperating with the setscrew 72 to releasably hold the pins 70 in the retracted position. The pins 70 are cut away as at 78 so that as pressure is applied to the workpiece 10 by the cutter, the pin 70 will wedge progressively tighter against the setscrew 72.

A plurality of pins 80 carried by the locating disc 18, are provided as an aid in measuring dimensions on the workpiece 10 as the cutting tool is applied thereto. One end of each pin 80 bears against the edge 38 of the flange 32 as is clearly illustrated in Fig. 3 of the drawings, and since pins 80 are of predetermined lengths, they may be used to measure the said dimensions by applying a measuring instrument to the outermost ends of the pin 80, and to the surfaces of the workpiece 10 being machined. Pins 80 are held in place by retainers 82 attached to the locating disc 18 and extending into a slot 84 formed in the pins 80.

It is now apparent from the foregoing that the workpiece 10 is placed on the fixture through use of the locating diameter or shoulder 36 with the wall 30 resting against the surfaces of the ribs 42 on the contact plates 22. Vacuum is applied to the workpiece 10 through the center of the fixture by way of the passage 44 to all surfaces of the cavity 34 by means of the spaces provided between the ribs 42. An even suction is, therefore, applied to the workpiece 10 inside the cavity 34, thus eliminating any possible distortion that would otherwise be present through use of clamps, chuck jaws and the like.

Driving force for the workpiece 10 is obtained from a combination of metal to metal frictional force between the workpiece 10 and the fixture or ribs 42 and the resilient seal 46 around the flange 32 and the locating disc 18.

Inasmuch as the dimensions from edge 38 to the faces of the workpiece 10 being machined, is very important, the pins 80 are included and so disposed as to positively locate the edge 38 of any workpiece to be machined. The spring-loaded jack pins 70 may be used in any large diameter workpiece to eliminate difficulties caused by the pressure of the cutting tool and "chatter" caused thereby.

Having thus described the invention what is claimed as new and desired to be secured by Letters Patent is:

1. For a workpiece having a wall provided with an annular flange on one face thereof having a continuous, outwardly facing edge and a periphery, presenting an imperforate cavity, a fixture for mounting said workpiece on rotatable structure of a machine tool, said fixture including a disc having a periphery, a circular, marginal edge on one face thereof and an annular shoulder perpendicular to said marginal edge; a contact plate provided with a number of ribs engageable with said face of the wall when the workpiece is mounted on the fixture with the plate disposed in the cavity and said flange circumscribing the shoulder, said disc and said plate being provided with interconnected passages communicating with the cavity; means securing the plate to the disc; support means; means for securing said support means to said structure; means attaching the disc to said support means; a split, annular band of resilient material surrounding said peripheries; a split ring surrounding the band; take-up means on the ring for clamping the band tightly against said peripheries to avoid leakage of air into the cavity between said marginal edge of the disc and said edge of the workpiece, and between said shoulder and the flange when a vacuum is placed on the passages and therefore, on the cavity whereby to hold said face against the ribs; a laterally-extending bracket on the ring; and means mounting the bracket on the support means.

2. For a workpiece having a wall provided with an annular flange on one face thereof having a continuous, outwardly facing edge and a periphery, presenting an imperforate cavity, a fixture for mounting said workpiece on rotatable structure of a machine tool, said fixture including a disc having a periphery, a circular, marginal edge on one face thereof and an annular shoulder perpendicular to said marginal edge; a contact plate provided with a number of ribs engageable with said face of the wall when the workpiece is mounted on the fixture with the plate disposed in the cavity and said flange circumscribing the shoulder, said disc and said plate being provided with interconnected passages communicating with the cavity; means securing the plate to the disc; a base member; a supporting block; means for securing said base member to said structure; means mounting the supporting block on said base member; means attaching the disc to said supporting block; a split, annular band of resilient material surrounding said peripheries; a split ring surrounding the band; take-up means on the ring for clamping the band tightly against said peripheries to avoid leakage of air into the cavity between said marginal edge of the disc and said edge of the workpiece, and between said shoulder and the flange when a vacuum is placed on the passages and therefore, on the cavity whereby to hold said face against the ribs; a laterally-extending bracket on the ring; means mounting the bracket on the supporting block; and a plurality of spring-loaded jacks mounted on the base member between the latter and the workpiece, engaging said face of the workpiece exteriorly of the cavity, and cooperable with said ribs for holding the workpiece against distortion as a cutter is applied to the opposite face thereof.

3. For a workpiece having a wall provided with an annular flange on one face thereof having a continuous, outwardly facing edge and a periphery, presenting an imperforate cavity, a fixture for mounting said workpiece on rotatable structure of a machine tool, said fixture including a disc having a periphery, a circular, marginal edge on one face thereof and an annular shoulder perpendicular to said marginal edge; a contact plate provided with a number of ribs engageable with said face of the wall when the workpiece is mounted on the fixture with the plate disposed in the cavity and said flange circumscribing the shoulder, said disc and said plate being provided with interconnected passages communicating with the cavity; means securing the plate to the disc; a base member; a supporting block; means for securing said base member to said structure; means mounting the supporting block on said base member; means attaching the disc to said supporting block; a split, annular band of resilient material surrounding said peripheries; a split ring surrounding the band; take-up means on the ring for clamping the band tightly against said peripheries to avoid leakage of air into the cavity between said marginal edge of the disc and said edge of the workpiece, and between said shoulder and the flange when a vacuum is placed on the passages and therefore, on the cavity whereby to hold said face against the ribs; a laterally-extending bracket on the ring; means mounting the bracket on the supporting block; and a plurality of pins of predetermined length carried by said disc and engageable with said edge of the flange in perpendicular relationship therewith for aiding in measuring the dimensions of the opposite face of the workpiece as a cutter is applied thereto.

References Cited in the file of this patent

UNITED STATES PATENTS

| | | |
|---|---|---|
| 283,367 | Barclay | Aug. 21, 1883 |
| 1,291,475 | Geist et al. | Jan. 14, 1919 |
| 1,345,644 | Southwick | July 6, 1920 |
| 1,414,190 | Koehler | Apr. 25, 1922 |
| 1,744,313 | Kadow | Jan. 21, 1930 |
| 2,366,935 | Schmid | Jan. 9, 1945 |
| 2,444,531 | Richardson | July 6, 1948 |